US009258357B2

(12) United States Patent
Huang et al.

(10) Patent No.: US 9,258,357 B2
(45) Date of Patent: Feb. 9, 2016

(54) METHOD FOR ACCESSING PLURAL CLOUD STORAGES, ELECTRONIC APPARATUS AND NON-TRANSITORY COMPUTER READABLE MEDIUM

(71) Applicant: HTC Corporation, Taoyuan County (TW)

(72) Inventors: Chen-Cherng Huang, Taoyuan County (TW); Mao-Yuan Kao, Taoyuan County (TW); Nancy Lu, Taoyuan County (CN); Huai Jiang, Taoyuan County (CN)

(73) Assignee: HTC Corporation, Taoyuan (TW)

( * ) Notice: Subject to any disclaimer, the term of this patent is extended or adjusted under 35 U.S.C. 154(b) by 356 days.

(21) Appl. No.: 13/875,292

(22) Filed: May 2, 2013

(65) Prior Publication Data
US 2014/0310332 A1   Oct. 16, 2014

(30) Foreign Application Priority Data
Apr. 12, 2013   (CN) .......................... 2013 1 0127583

(51) Int. Cl.
G06F 15/16   (2006.01)
H04L 29/08   (2006.01)
H04W 4/00   (2009.01)

(52) U.S. Cl.
CPC .............. *H04L 67/10* (2013.01); *H04W 4/003* (2013.01)

(58) Field of Classification Search
CPC ............................... H04L 67/10; H04W 4/003
See application file for complete search history.

(56) References Cited

U.S. PATENT DOCUMENTS

| 8,965,957 | B2* | 2/2015 | Barros | 709/203 |
| 2006/0123116 | A1* | 6/2006 | Rahman et al. | 709/227 |
| 2010/0042720 | A1* | 2/2010 | Stienhans et al. | 709/226 |
| 2011/0138047 | A1* | 6/2011 | Brown et al. | 709/226 |
| 2013/0060928 | A1* | 3/2013 | Shao | 709/223 |

FOREIGN PATENT DOCUMENTS

| CN | 102255934 A | 11/2011 |
| TW | 201207630 A | 2/2012 |
| TW | 201234810 A | 8/2012 |

OTHER PUBLICATIONS

TW Office Action.

* cited by examiner

*Primary Examiner* — Ario Etienne
*Assistant Examiner* — Thorne E Waugh
(74) *Attorney, Agent, or Firm* — CKC & Partners Co., Ltd.

(57) ABSTRACT

A method for accessing plural cloud storages, an electronic apparatus and a non-transitory computer readable medium are disclosed herein. The method for accessing plural cloud storages includes steps of: providing a unified interface on the data processing system, the unified interface being configured for offering a unified interface format instruction to plural application programs to access each of the cloud storages; linking the unified interface with a plurality of configuration plug-ins, each of the configuration plug-ins comprises at least one distinct instruction for accessing a particular cloud storage; and converting a request with the unified interface format instruction from one of the application programs to one of the at least one distinct instruction according to the configuration plug-ins for accessing a destination cloud storage of the cloud storages.

12 Claims, 3 Drawing Sheets

METHOD FOR ACCESSING PLURAL CLOUD STORAGES, ELECTRONIC APPARATUS AND NON-TRANSITORY COMPUTER READABLE MEDIUM

RELATED APPLICATIONS

This application claims the priority benefit of Chinese application serial no. 201310127583.X, filed Apr. 12, 2013, the full disclosure of which is incorporated herein by reference.

BACKGROUND

1. Field of Invention

The present application relates to a method for accessing plural cloud storages. More particularly, the present application relates to a method or an application program interface for accessing plural cloud storages.

2. Description of Related Art

Recently, electronic communication devices become common belongings to everyone in modern society. For example, electronic communication devices such as mobile phones, personal digital assistants, smart phones and tablet computers are widespread in various applications.

Recently, electronic communication devices are popular because the devices have various functions (such as internet surfing, multimedia message transmitting, file sharing, document editing, photo shooting and paper reading). With the developments of on-line services over Internet, the electronic communication devices may integrate with many cloud services based on the communicative network.

Taking portable electronic devices for example, in order to maintain high portability, most of the portable electronic devices are regulated by limited sizes, limited weights and limited electricity capacities. Therefore, portable electronic devices may not be able to equip a hard-drive/memory with a large storage volume.

SUMMARY

An aspect of the present application is to provide a method for accessing plural cloud storages. The method is suitable in a data processing system capable of executing plural application programs, for accessing plural cloud storages. The method includes steps of: providing a unified interface on the data processing system, the unified interface being configured for offering a unified interface format instruction to plural application programs to access each of the cloud storages; linking the unified interface with a plurality of configuration plug-ins, each of the configuration plug-ins comprises at least one distinct instruction for accessing a particular cloud storage; and, converting a request with the unified interface format instruction from one of the application programs to one of the at least one distinct instruction according to the configuration plug-ins for accessing a destination cloud storage of the cloud storages.

Another aspect of the present application is to provide an electronic apparatus, which includes a plurality of application programs and a unified interface. The application programs are embodied on a non-transitory computer readable medium for execution on the electronic apparatus. The unified interface is embodied on a non-transitory computer readable medium for execution on the electronic apparatus in conjunction with the application programs. The unified interface is configured for offering a unified interface format instruction. The unified interface format instruction is utilized by the application programs to access each of the cloud storages. The unified interface is linked with a plurality of configuration plug-ins. Each of the configuration plug-ins comprising at least one distinct instruction for accessing one particular cloud storage. When one of the application programs sends a request with the unified interface format instruction, the unified interface converts the request to one of the at least one distinct instruction according to the configuration plug ns, so as to access a destination cloud storage of the cloud storages.

Another aspect of the present application is to provide a non-transitory computer readable medium having stored thereon executable instructions, that when executed by the processor of a computer control the computer to perform steps includes: providing a unified interface configured for offering a unified interface format instruction to plural application programs to access each of the cloud storages; linking the unified interface with a plurality of configuration plug-ins, each of the configuration plug-ins comprises at least one distinct instruction for accessing a particular cloud storage; and, converting a request with the unified interface format instruction from one of the application programs to one of the at least one distinct instruction according to the configuration plug-ins for accessing a destination cloud storage of the cloud storages.

BRIEF DESCRIPTION OF THE DRAWINGS

The invention can be more fully understood by reading the following detailed description of the embodiments, with reference made to the accompanying drawings as follows.

DETAILED DESCRIPTION

In order to solve the issue of shorting storage on the electronic devices, some cloud storages accessible over Internet are developed to provide extra storage space for electronic devices especially for portable devices. In addition, the cloud storages may also provide high portability and synchronization function between different devices. Therefore, the cloud storages are popular in recent days. There are various providers providing all kinds of cloud storages.

Each provider of the cloud storages develops different regulations/specifications on instructions, such as, but not limited to, Representational State Transfer application programming interface (REST API), for accessing their own cloud storage. If application programs want to support many cloud storages, individual instructions corresponding to all cloud storages must be implemented in each one of the application programs. If a new cloud storage is launched, all application programs must be updated again to support the new cloud storage. In this case, it is hard to maintain all application programs.

Therefore, this disclosure provides a unified interface for providing a unified interface format instruction for accessing all kinds of cloud storages by applications.

Figure 1:
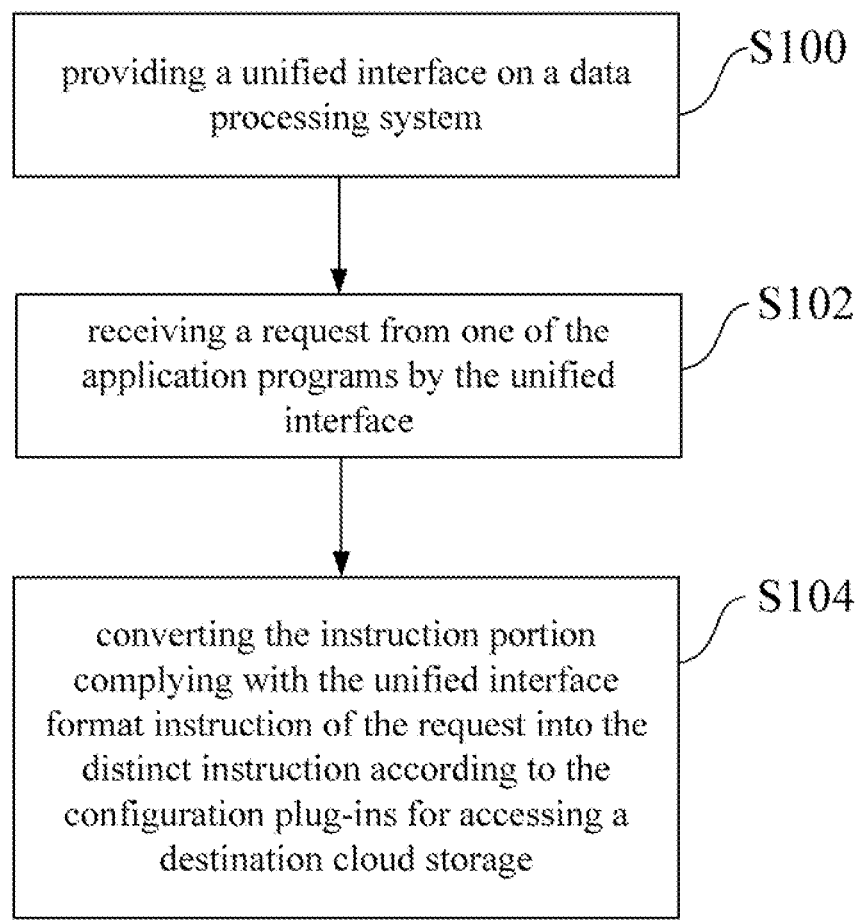
FIG. 1 is a flow chart illustrating a method for accessing plural cloud storages according to an embodiment of the disclosure.
Figure 2:
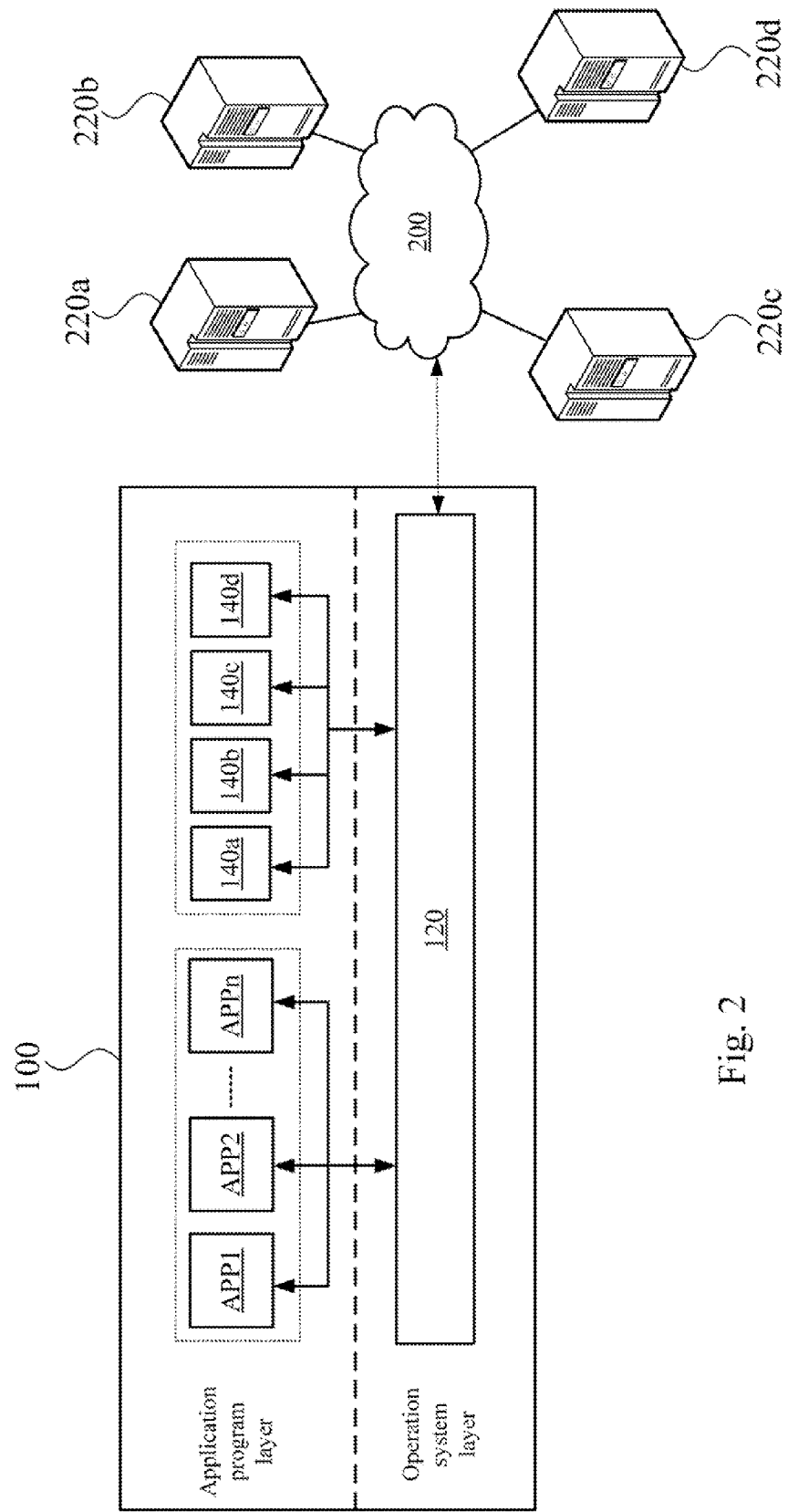
FIG. 2 is a schematic diagram illustrating an electronic apparatus and cloud storages according to an embodiment of the disclosure.

Reference is made to FIG. 1, FIG. 2. FIG. 1 is a flowchart illustrating a method for accessing plural cloud storages according to an embodiment of the disclosure. FIG. 2 is a schematic diagram illustrating an electronic apparatus 100 and cloud storages 220a~220d according to an embodiment of the disclosure. In this embodiment, the electronic apparatus 100 can be a mobile phone, a smart phone, a tablet, a laptop, a personal computer, a mobile communication device or an equivalent communication device.

The method for accessing plural cloud storages is suitable in a data processing system capable of executing plural application programs. In this embodiment, the data processing system can be the electronic apparatus 100 shown in FIG. 2. However, the disclosure is not limited hereto, and the method for accessing plural cloud storages can be implemented in another equivalent data processing system.

As shown in FIG. 2 of this embodiment, the electronic apparatus 100 include plural application programs (e.g. application programs APP1, APP2, APP3 . . . and APPn), a unified interface 120 and plural configuration plug-ins (e.g., configuration plug-ins 140a, 140b, 140c and 140d).

For example, the electronic apparatus 100 may include a communicative module, a storage module and a processing module (not shown in figures). The communicative module can be configured for establishing a communicative connection to the communicative network 200 and the cloud storages (e.g., the cloud storages 220a~220d in FIG. 2 of this embodiment) over the communicative network 200 shown in FIG. 2. The storage module can be configured for storing the configuration plug-ins (e.g., the configuration plug-ins 140a~140d in FIG. 2 of this embodiment). The processing module can be configured for executing the application programs APP1 APP2, APP3 . . . and APPn and the unified interface 120 shown in FIG. 2.

In the embodiment shown in FIG. 2, the application programs APP1~APPn can be embodied on a non-transitory computer readable medium for execution on the electronic apparatus 100 (e.g., on an application layer of the electronic apparatus 100). In the embodiment, each of the application programs APP1~APPn can be application software installed onto the electronic apparatus 100. For example, the application programs can be used in photo-editing, text-editing, web-browsing, email, social-networking, system backup, file-sharing, on-line album, and/or similar purposes. The application programs APP1~APPn can be programs installed by users over network, via an installation disk or any equivalent manner.

Each application program APP1~APPn may include a function to interact or be integrated with different cloud storages. In other words, the program APP1~APPn has a function involving accessing at least one of cloud storages 220a, 220b, 220c and 220d. As shown in FIG. 2, the cloud storages 220a, 220b, 220c and 220d can be storage servers owned by different cloud storage providers. For example, the cloud storage providers may include Dropbox, SkyDrive, GoogleDrive, Baidu cloud, Vdisk, Box.net, etc.

As shown in FIG. 1, step S100 of the method is executed for providing a unified interface 120 on a data processing system (e.g. the electronic apparatus 100). The unified interface 120 is configured for accessing each of the cloud storages 220a, 220b, 220c and 220d over a communicative network 200. The unified interface 120 can be embodied on a non-transitory computer readable medium for execution on the electronic apparatus 100 (e.g., on an operation system layer or a system framework layer, such as Google Android framework layer, of the electronic apparatus 100) in conjunction with the application programs APP1~APPn. The unified interface 120 is configured for handling a request from one of the application programs APP1~APPn to access a destination cloud storage of the cloud storages 220a, 220b, 220c and 220d.

In this embodiment, the unified interface 120 is linked with configuration plug-ins 140a, 140b, 140c and 140d corresponding to the cloud storages 220a, 220b, 220c and 220d respectively. Each of the configuration plug-ins 140a~140d includes distinct instructions (e.g. REST APIs) for accessing each of the cloud storages 220a~220d respectively. For example, the configuration plug-in 140a contains the distinct instructions for accessing the cloud storage 220a; the configuration plug-in 140b contains the distinct instructions for accessing the cloud storage 220b, etc. In practices, the same operation of loading sections 1 to 10 can be triggered by different instructions on different cloud storages. For example, the instruction in the cloud storage 220a can be described as "LOAD (1, 10)"; the instruction in the cloud storage 220b can be described as "Read sect(0001, 1010)"; the instruction in the cloud storage 220c can be described as "LOAD (s, 1, 10)"; etc.

The unified interface provides a unified interface format instruction to the application programs APP1~APPn. The request from one of the application programs includes an instruction in the unified interface format instruction and an assignment of the destination cloud storage.

In this embodiment, steps 102 and 104 are executed while the unified interface 120 is handling the request from one of the application programs APP1~APPn to access the destination cloud storage.

After step S100, step S102 of the method is executed for receiving the request from one of the application programs APP1~APPn by the unified interface 120. The request includes an instruction portion in the unified interface format instruction (provided by the unified interface 120) and an assignment portion corresponding to the destination cloud storage (e.g., the assignment portion can be a specific identification code representing specific one of the cloud storages).

Afterward, step S104 of the method is executed for converting the instruction portion complying with the unified interface format instruction of the request into the distinct instruction for accessing the destination cloud storage according to the configuration plug-ins 140a~140d by the unified interface 120.

For example, if the destination cloud storage is assigned to be the cloud storage 220b, the instruction portion complying with the unified interface format instruction of the request can be converted into the distinct instruction according to the configuration plug-in 140b by the unified interface 120.

Then, the electronic apparatus 100 may send out the converted instruction to the cloud storage 220b for accessing contents on the cloud storage 220b.

The following paragraph is an example, based the aforementioned example of loading instructions, for demonstrating how to convert the unified interface format instruction into the distinct instruction. In one embodiment of present invention, all the application programs APP1~APPn are only required to execute unified interface format instruction "REMOTE_STORAGE_LOAD(Target_ID, 1, 10)" provided by the unified interface 120. The first parameter "Target_ID" of the unified instruction is the assignment portion, which indicates which remote cloud storage applications is requested by user. The second parameter of the unified instruction indicates the beginning of the loading section. The third parameter of the unified instruction indicates the end of loading section. If the assignment portion (i.e., Target_ID) corresponds to the cloud storage 220b, it means that the cloud storage 220b is assigned to be the destination cloud storage. In this case, the unified interface 120 converts the unified instruction "REMOTE_STORAGE_LOAD(220b, 1, 10)" to the distinct instruction "Read sect(0001, 1010)" by referencing plug-in 140b, so as to access to cloud storage 220b with the distinct instruction "Read sect(0001, 1010)". Therefore, the distinct instructions on all cloud storages are not required to be implemented within each application program APP1~APPn on the electronic apparatus 100. What each application program APP1~APPn needs to know is the assignment portions (e.g., the identification codes for assignment) of all destination cloud storages. In one embodiment of this invention, each application program APP1~APPn could query all available configuration plug-ins (corresponding to all available cloud storages) installed on the electronic devices, and then specify one particular assignment (i.e., one particular identification code) of the destination cloud storage in order to access the destination cloud storage. Each application program APP1~APPn may easily access to all cloud storages by sending an instruction in unified format and an assignment of the destination cloud storage to the unified interface 120, and the unified interface 120 will complete the rest of accessing operations.

Figure 3:
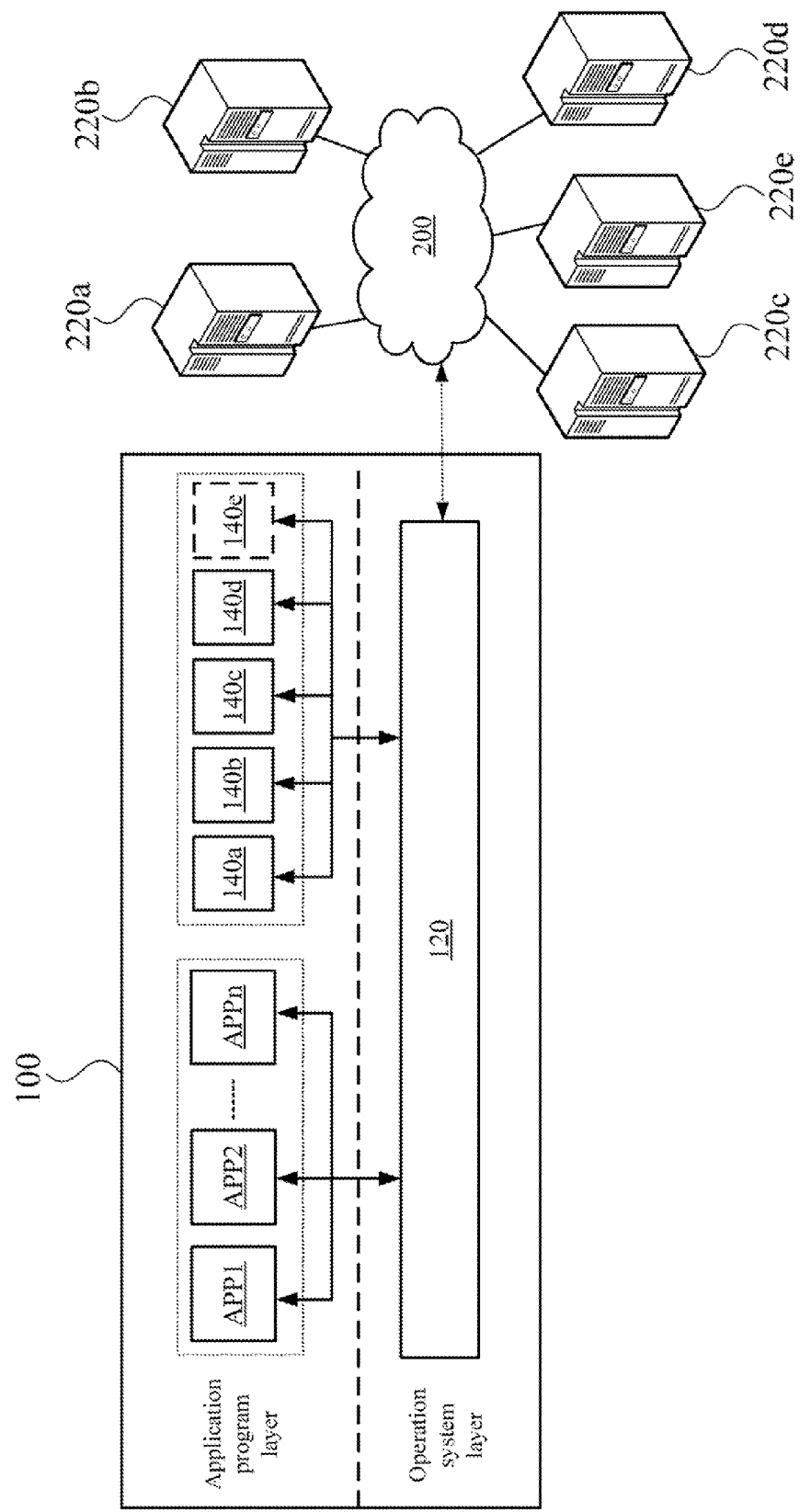
FIG. 3 is a schematic diagram illustrating an electronic apparatus, cloud storages and a new cloud storage according to an embodiment of the disclosure.

Reference is also made to FIG. 3, which is a schematic diagram illustrating the electronic apparatus 100, the cloud storages 220a~220d and a new cloud storage 220e according to an embodiment of the disclosure.

Furthermore, when there is a new cloud storage 220e added among other cloud storages 220a~220d, and the new cloud storage 220e is available over the communicative network 200. A new configuration plug-in 140e shown in FIG. 3 corresponding to the new cloud storage 220e can be updated to the electronic apparatus 100 over the communicative network 200 (e.g. Internet). The new configuration plug-in 140e is further linked with the unified interface 120, such that the unified interface 120 of the electronic apparatus 100 may further supports another cloud storage (i.e., the new cloud storage 140e). In one embodiment of this invention, the new configuration plug-in 140e linked with the unified interface could be done by registering the identification (ID, e.g. a name or a unique number associating with a particular cloud storage), all supported access APIs (e.g. REST APIs) of new cloud storage 140e to unified interface 120 while the new configuration plug-in 140e is installing.

In this case, the application programs APP1~APPn are not required to update software program individually for supporting the new cloud storage 140e. By updating one new configuration plug-in 140e to the unified interface 120, all the application programs APP1~APPn can easily utilizes the services from the new cloud storage 140e. For example, as aforementioned, each application program APP1~APPn could query names or identifications of all available cloud storage. The same software code of the application programs APP1~APPn is able to detect new available cloud storage and corresponding configuration plug-in, and then instantly accessing to new added cloud storage.

The following paragraph describes one embodiment of present disclosure in the case of removing the supporting of the new cloud storage 140e. However, the disclosure is not limited to remove the new cloud storage 140e. In another embodiment, other existed cloud storages 220a~220d can be removed in the same way. In present case, the electronic apparatus 100 provides a user interface for user to un-install (remove) the new configuration plug-in 140e. While the un-installing process of the new configuration plug-in 140e, the electronic apparatus 100 unregisters the identification code and removes all supported access APIs (e.g. REST APIs) corresponding to the new cloud storage 140e from the unified interface 120. Therefore, the application programs APP1~APPn are not required to update software program individually as well.

Based on aforesaid embodiments, the distinct instructions on all cloud storages are not required to be implemented within each application program on the electronic apparatus. Each application program may easily access to all cloud storages by sending an instruction in unified format and an assignment of the destination cloud storage to the unified interface, and the unified interface will complete the rest of accessing operations. In addition, the electronic apparatus is easier to maintain. When there is an update related to the cloud storages, the updating procedure can be done by adding a new plug-in or removing an existed plug-in to the unified interface instead of amending all the application programs, in order to support a new cloud storage or un-support an existed cloud storage.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims.

What is claimed is:

1. A method, in a data processing system capable of executing plural application programs, for accessing plural cloud storages, comprising:
   providing a unified interface on the data processing system, the unified interface being configured for offering a unified interface format instruction to plural application programs to access each of the cloud storages;
   linking the unified interface with a plurality of configuration plug-ins, each of the configuration plug-ins comprises at least one distinct instruction for accessing as particular cloud storage;
   converting a request with the unified interface format instruction from one of the application programs to one of the at least one distinct instruction according to the configuration plug-ins for accessing a destination cloud storage of the cloud storages;
   updating the configuration plug-ins over a communicative network for supporting another cloud storage or un-supporting one existed cloud storage;
      wherein the step of updating the configuration plug-ins comprises adding a new configuration plug-in or removing an existed configuration plug-in; and
   installing one of the configuration plug-ins by registering an identification associating with the existed cloud storage and registering a plurality of supported access Application Programming Interfaces (APIs), or un-installing one of the configuration plug-ins by un-registering the identification associating with the existed cloud storage and removing the supported access APIs.

2. The method of claim 1, wherein the request from one of the application programs comprises an instruction portion with the unified interface format instruction and an assignment portion corresponding to the destination cloud storage, wherein the assignment portion represents the destination cloud storage assigned by the request.

3. The method of claim 1, wherein the unified interface is implemented in an operation system instead of an application programs layer.

4. The method of claim 1, wherein, in the step of converting the request with the unified interface format instruction into the at least one distinct instruction, wherein the at least one distinct instruction is a Representational State Transfer Application Programming Interface (REST API).

5. An electronic apparatus, comprising:
- a plurality of application programs embodied on a non-transitory computer readable medium for execution on the electronic apparatus;
- a unified interface embodied on a non-transitory computer readable medium for execution on the electronic apparatus in conjunction with the application programs, the unified interface being configured for offering a unified interface format instruction, the unified interface format instruction being utilized by the application programs to access each of the cloud storages, the unified interface being linked with a plurality of configuration plug-ins, each of the configuration plug-ins comprising at least one distinct instruction for accessing a particular cloud storage,
- wherein, when one of the application programs sends a request with the unified interface format instruction, the unified interface converts the request to one of the at least one distinct instruction according to the configuration plug-ins, so as to access a destination cloud storage of the cloud storages;
- wherein the unified interface updates the configuration plug-ins over a communicative network for supporting another cloud storage or un-supporting one existed cloud storage;
- wherein, while updating the configuration plug-ins, the unified interface selectively add a new configuration plug-in or remove one existed configuration plug-in;
- wherein the unified interface installs one of the configuration plug-ins by registering an identification associating with the existed cloud storage and registering a plurality of supported access Application Programming Interfaces (APIs), or the unified interface un-installs one of the configuration plug-ins by un-registering the identification associating with the existed cloud storage and removing the supported access APIs.

6. The electronic apparatus of claim 5, wherein the request from one of the application programs comprises an instruction portion with the unified interface format instruction and an assignment portion corresponding to the destination cloud storage, wherein the assignment portion represents the destination cloud storage assigned by the request.

7. The electronic apparatus of claim 5, wherein the unified interface is implemented in an operation system instead of an application program layer.

8. The electronic apparatus of claim 5, wherein the at least one distinct instruction is a Representational State Transfer Application Programming Interface (REST API).

9. A non-transitory computer readable medium having stored thereon executable instructions that when executed by the processor of a computer control the computer to perform steps comprising:
- providing a unified interface configured for offering a unified interface format instruction to plural application programs to access each of the cloud storages;
- linking the unified interface with a plurality of configuration plug-ins, each of the configuration plug-ins comprises at least one distinct instruction for accessing a particular cloud storage; and
- converting a request with the unified interface format instruction from one of the application programs to one of the at least one distinct instruction according to the configuration plug-ins for accessing a destination cloud storage of the cloud storages;
- wherein the configuration plug-ins are undated over a communicative network for supporting another cloud storage or un-supporting one existed cloud storage;
  - wherein the configuration plug-ins are updated by adding a new configuration plug-in or removing an existed configuration plug-in; and
- wherein one of the configuration plug-ins is installed by registering an identification associating with the existed cloud storage and registering a plurality of supported access Application Programming Interfaces (APIs), or one of the configuration plug-ins is un-installed by un-registering the identification associating with the existed cloud storage and removing the supported access APIs.

10. The non-transitory computer readable medium of claim 9, wherein the request from one of the application programs comprises an instruction portion with the unified interface format instruction and an assignment portion corresponding to the destination cloud storage, wherein the assignment portion represents the destination cloud storage assigned by the request.

11. The non-transitory computer readable medium of claim 9, wherein the unified interface is implemented in an operation system instead of an application programs layer.

12. The non-transitory computer readable medium of claim 9, wherein, in the step of converting the request with the unified interface format instruction into the at least one distinct instruction, wherein the at least one distinct instruction is a Representational State Transfer Application Programming Interface (REST API).

* * * * *